(No Model.)
E. S. GLOVER.
PROSPECTING IMPLEMENT FOR MINERS' USE.
No. 598,146. Patented Feb. 1, 1898.
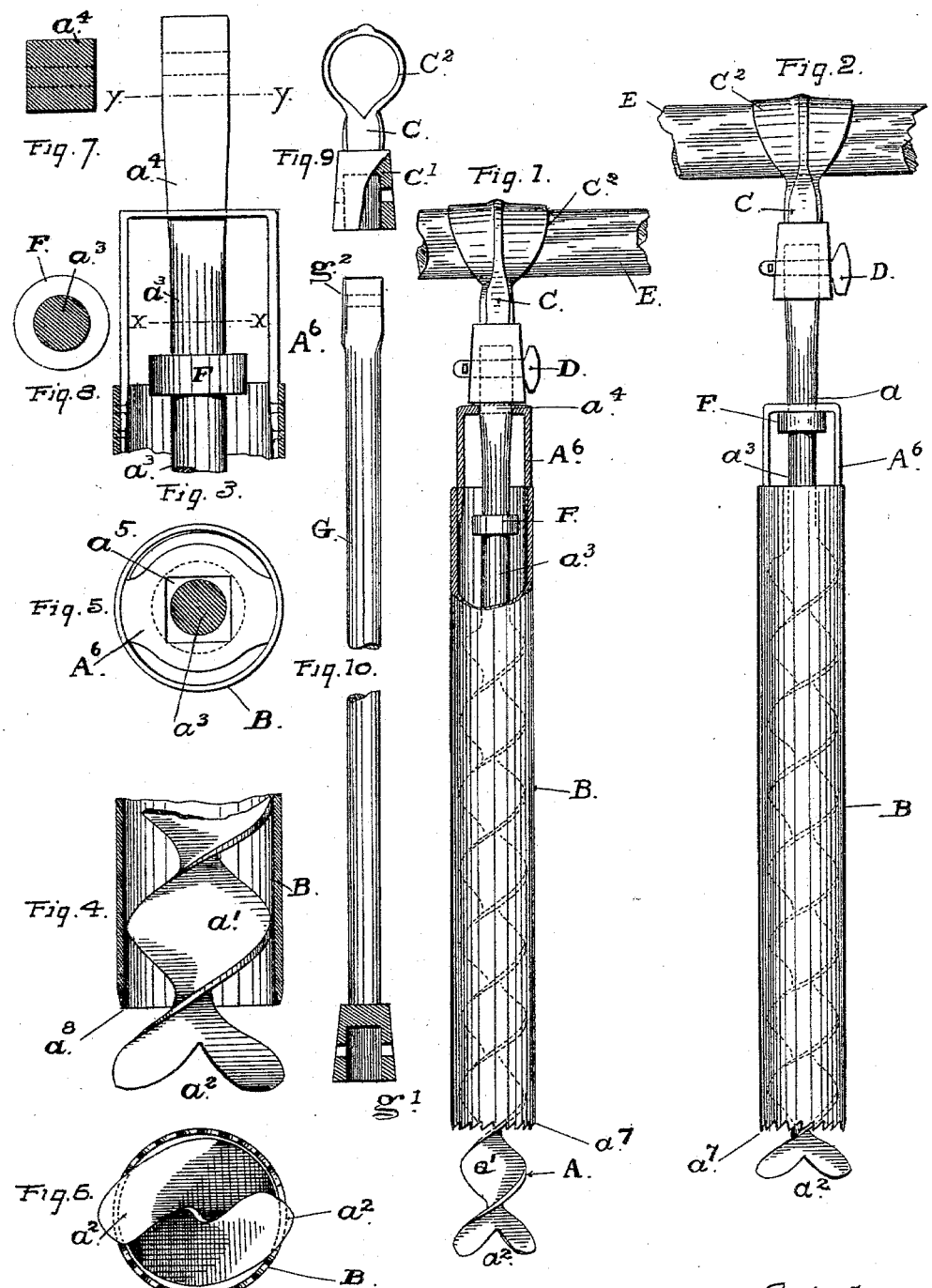
Witnesses:
S. C. Meyer
M. Regnes
Inventor:
Eli Sheldon Glover
by Smith & Osborn Attys.

UNITED STATES PATENT OFFICE.

ELI SHELDON GLOVER, OF SAN FRANCISCO, CALIFORNIA.

PROSPECTING IMPLEMENT FOR MINERS' USE.

SPECIFICATION forming part of Letters Patent No. 598,146, dated February 1, 1898.

Application filed October 28, 1897. Serial No. 656,709. (No model.)

*To all whom it may concern:*

Be it known that I, ELI SHELDON GLOVER, a citizen of the United States, residing in the city and county of San Francisco and State of California, have invented certain new and useful Improvements in Prospecting Implements for Miners' Use, of which the following is a specification.

This invention has for its object to provide for the use of miners and prospectors a tool or implement for cutting and sinking prospect-holes and raising the excavated material to the surface for inspection.

The device is devised and constructed for the special work of cutting through ice and working in hard frozen ground and for carrying the hole to any required depth.

To such end and object my said invention consists in certain novel construction and combination of parts, as hereinafter more particularly described, and pointed out in the claim at the end of this specification, reference being had to the accompanying drawings, in which—

Figure 1 represents in elevation a prospecting implement constructed according to my said invention, the parts being adjusted for cutting and boring into the ground and the upper portion of the casing being shown in section. Fig. 2 is a similar view showing the position assumed by the working parts in the operation of elevating the excavated material and charging the tube preparatory to drawing the implement up to the surface. Fig. 3 is a side view, on an enlarged scale and partly in section, of the upper end of the implement. Fig. 4 is a similar view, on an enlarged scale, of the lower end of the implement. Fig. 5 is a top view of Fig. 3. Fig. 6 is an inverted plan or bottom view of Fig. 4. Fig. 7 is a cross-section at line $y\,y$, Fig. 3. Fig. 8 is a cross-section taken at line $x\,x$, Fig. 3. Fig. 9 is a view of the head and socket that connects the lever or handle to the implement to operate it. Fig. 10 is a detail view of one of the extension-rods provided with the implement for increasing the length of the same as the work is carried down.

The principal parts of this implement consist of an excavating-tool A with a spiral blade in shape resembling an auger, a tubular cutting-tool B, surrounding and incasing the spiral portion of the part A, a coupling device or means to lock the two parts together when the operation of cutting into the ground and sinking the implement is performed, and to disconnect the one from the other to allow the spiral blade A to be rotated while the tube B remains in the hole. In this last-mentioned operation the spiral blade performs the office of an elevator or conveyer and raises the excavated material in the lower part of the hole upward into the tube, and by repeated rotation of the tool A when unlocked from the part B at intervals between the cutting or excavating operations of the two tools as they are locked together and worked jointly the tube is filled with the excavated material before it is drawn up to the surface.

The tool A is constructed with a long spiral portion $a'$ with a broad surface similar to an auger, a cutting-bit $a^2$ on the lower end and a straight shank $a^3$, terminating in a square-end portion to fit a socket on a head or part C, by which a handle or lever is secured on the end of the tool for turning it. The square portion of the shank $a^3$ and the socket $C'$ of the head C are slotted to receive a key D, by which the parts are fastened together.

The spiral portion of the tool A is made somewhat smaller in diameter than the inclosing tube B, so as to revolve easily in the tube without becoming clogged by the material. The bit $a^2$ on the lower end of the spiral extends outside of and below the end of the tube and is provided with two cutting-blades extending outwardly and about diametrically opposite to each other with their ends terminating in broad flat cutting-points that project beyond the tube to cut in a greater circle than the bottom cutting edge of the tube. Such lower end portion of the tool A performs the work of cutting into and loosening the ground into which the prospect-hole is being sunk and also of drawing down the tube and causing it to advance in the loosened material, this last-mentioned operation being effected by the rotative movement given to the spiral portion of the tool A, which extends below the tube and to the tube B as well; but in addition to these functions the whole tool A acts as an elevator to raise the material into the tube and fill the same, so that after the tube becomes filled or charged and the implement is drawn up to the surface the excavated material thus contained between the spirals and the surrounding tube will show the character and the conditions of the ground and the state through which the hole is being driven.

In performing the first-mentioned operation the two tools A and B are locked or fastened together, so as to be rotated as a single implement, and while the spiral cutter works against the material the tube is rotated simultaneously with it and its bottom edge is caused to cut its way and advance into the material. In the second operation, on the other hand, the tube B is unlocked from the tool A and remains at rest, while the tool A alone is rotated to elevate the excavated material into the tube. These two different operations are carried on alternately and at intervals of greater or less frequency as the implement advances, according to the condition of the ground in which the implement is working, and provision is made for locking the two parts together and for unlocking them without withdrawing the implement from the hole by forming on the shank $a^3$ of the tool A a square or rectangular portion $a^4$ to fit a square hole $a^5$ in a stirrup or strap $A^6$ across the open top end of the tube, so that by a short downward movement of the tool A in the tube B the square part of the shank is pressed into the square hole in the fixed strap $A^6$ and the two parts A and B are locked together for rotation. A quick upward movement of the tool A, on the other hand, will draw the square portion of the shank $a^3$ out of the stirrup and bring the cylindrical part into the hole, in which it is fitted loosely to turn without moving the tube. The extent of this upward movement is governed by a fixed collar F on the shank.

The head C, detachable from the end of the shank, is formed of the socket C' to take the square end of the shank and the loop $C^2$ for inserting a hand-lever E, which is made to be drawn out of the loop $C^2$ for conveniently packing the implement into small compass.

Extension-rods G, Fig. 10, are furnished with the implement for the purpose of carrying the work down to a greater depth below the surface than can be done with the tool A alone. The lower end of this rod G is provided with a socket $g'$ to receive the top end of the shank $a^3$, and the upper end is finished square to fit the socket of the head C, which is secured on that end.

The bottom edge of the tube A is provided with sharp teeth or points $a^7 a^7$, as shown in Figs. 1 and 2, or it is finished with a continuous beveled cutting edge $a^8$, as represented in Fig. 4.

Having thus fully described my invention, what I claim therein as new, and desire to secure by Letters Patent, is—

The herein-described prospecting implement comprising a cylindrical rotatable casing open at both ends having a serrated cutting edge on the bottom, a stirrup across the top provided with a rectangular hole, the cutting and elevating tool having a spiral blade terminating in a cutter on the lower end and adapted to move longitudinally as well as to rotate within the casing, a straight shank, a handle and a locking means for attaching the shank to the handle said shank having a cylindrical part adapted to turn freely within the stirrup and a rectangular portion above the cylindrical part to lock in the rectangular hole of the stirrup and a collar on the shank below the cylindrical part, constructed for operation as set forth.

In testimony that I claim the foregoing I have hereunto set my hand and seal.

ELI SHELDON GLOVER. [L. S.]

Witnesses:
C. W. M. SMITH,
CHAS. E. KELLY.